US006459969B1

(12) United States Patent
Bates et al.

(10) Patent No.: US 6,459,969 B1
(45) Date of Patent: Oct. 1, 2002

(54) APPARATUS, PROGRAM PRODUCT AND METHOD OF PROCESSING DIAGNOSTIC DATA TRANSFERRED FROM A HOST COMPUTER TO A PORTABLE COMPUTER

(75) Inventors: Cary Lee Bates; Michael Thomas Schmitt, both of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/882,990

(22) Filed: Jun. 15, 2001

(51) Int. Cl.[7] ............................ G06F 7/00; G06F 19/00

(52) U.S. Cl. ............................ 701/29; 701/33; 701/31; 701/35; 701/32; 701/101; 701/114; 701/115; 340/439; 340/438; 340/459; 340/988; 340/426; 340/955; 370/329; 370/328; 370/401; 455/457; 455/404; 455/99; 123/436; 702/187; 702/184; 73/23.34

(58) Field of Search ............................ 701/35, 33, 32, 701/101, 29, 31, 102, 114, 115; 340/439, 438, 459, 988, 426, 955, 632; 370/329, 328, 401, 313; 455/457, 404, 99, 563, 414, 419; 123/436; 702/187, 184, 185; 705/4, 9, 29, 8, 26, 400; 324/663, 667; 73/23.34

(56) References Cited

U.S. PATENT DOCUMENTS

| | | | | | |
|---|---|---|---|---|---|
| 4,602,127 | A | * | 7/1986 | Neely et al. | 360/53 |
| 5,479,479 | A | * | 12/1995 | Braitberg et al. | 370/271 |
| 5,537,343 | A | | 7/1996 | Kikinis et al. | 364/708.1 |
| 5,604,441 | A | * | 2/1997 | Freese et al. | 324/663 |
| 5,727,202 | A | | 3/1998 | Kucala | 395/610 |
| 5,732,074 | A | * | 3/1998 | Spaur et al. | 370/313 |
| 5,819,227 | A | | 10/1998 | Obuchi | 705/1 |
| 5,916,286 | A | | 6/1999 | Seashore et al. | 701/29 |
| 5,938,721 | A | | 8/1999 | Dussell et al. | 701/211 |
| 6,016,476 | A | | 1/2000 | Maes et al. | 705/1 |
| 6,067,290 | A | * | 5/2000 | Paulraj et al. | 370/329 |
| 6,167,255 | A | * | 12/2000 | Kennedy et al. | 455/404 |
| 6,177,905 | B1 | | 1/2001 | Welch | 342/357.13 |
| 6,226,739 | B1 | | 5/2001 | Eagle | 713/1 |
| 6,308,120 | B1 | * | 10/2001 | Good | 340/438 |
| 6,330,499 | B1 | * | 12/2001 | Chou et al. | 701/32 |
| 2002/0004694 | A1 | * | 1/2002 | McLeod et al. | 701/29 |
| 2002/0007225 | A1 | * | 1/2002 | Costello et al. | 700/99 |

OTHER PUBLICATIONS

"Introducing the most flexible Vehicle/Fleet Management Product on the market", http://www.mill–auto.com/fleet__management.htm, Fleet Management, Date Unknown, Jun. 13, 2001.

* cited by examiner

*Primary Examiner*—Yonel Beaulieu
*Assistant Examiner*—Ronnie Mancho
(74) *Attorney, Agent, or Firm*—Matthew J. Bussan

(57) ABSTRACT

A diagnostic mechanism for processing diagnostic data transferred from a host computer (e.g., a motor vehicle computer) to a portable computer (e.g., a personal digital assistant (PDA), cellular phone, etc.) An alert is provided based on a comparison in the portable computer of a threshold variable (e.g., generated from a desired threshold value input into the portable computer by the user) and a diagnostic variable (e.g., fuel remaining, service interval, etc.) generated from the diagnostic data. Preferably, the alert includes a calendar entry displayed on a PDA. The alert may further include an alarm at a time-of-day preceding an alarm clock setting of the PDA. Consequently, the user does not have to rely on his/her memory to arise earlier in the morning to fill up with gasoline, for example. Preferably, the PDA receives the diagnostic data in response to being placed in a cradle mounted in a vehicle passenger compartment.

26 Claims, 5 Drawing Sheets

APPARATUS, PROGRAM PRODUCT AND METHOD OF PROCESSING DIAGNOSTIC DATA TRANSFERRED FROM A HOST COMPUTER TO A PORTABLE COMPUTER

FIELD OF THE INVENTION

The present invention relates in general to computer systems. More particularly, the present invention relates to an apparatus, program product and method of processing diagnostic data transferred from a host computer, such as a motor vehicle computer, to a portable computer, such as a personal digital assistant, cellular phone, etc.

BACKGROUND

Motor vehicles, no matter how fuel efficient, require frequent visits to refuelling stations. Similarly, motor vehicles require routine maintenance, such as engine oil and filter changes, chassis lubrication, tire rotation, air filter replacement, spark plug replacement, engine coolant replacement, transmission fluid replacement, engine belt replacement, brake pad replacement, and the like. In addition, motor vehicles sometimes require unscheduled maintenance for replacement of failed components, such as headlamps. There is presently no effective way for a driver to be reminded of these events. For example, drivers typically depend on a fuel gauge and/or a warning indicator light and/or audio alert fixedly installed in the vehicle to time visits to refuelling stations. Often drivers are reminded of the need to refuel their vehicle, but at the moment they have no spare time to accomplish the refuelling. Once the driver exits the vehicle, the need for refuelling is forgotten. This process may be repeated several times until the vehicle is eventually refuelled or runs out of fuel.

With regard to routine maintenance, drivers typically depend on maintenance schedules set forth in their vehicle owner's manual. These maintenance schedules are typically based on time and mileage intervals, which are often adjusted for different driving conditions. Keeping to these maintenance schedules is difficult at best. Failure to accomplish timely completion of the various maintenance service events can unfortunately lead to denied warranty claims. More recent vehicles often have fixedly installed diagnostic systems that typically include a warning indicator light and/or audio alert to make the driver aware that a maintenance service event is due. However, this presents the same problem as encountered in the refuelling situation described above. Namely, drivers have no spare time to have the vehicle serviced when alerted, and forget about the need to have the vehicle serviced after exiting the vehicle. This process may be repeated several times until the vehicle is eventually serviced, but often at a date much later than called for in the maintenance schedule.

Another area of difficulty is unscheduled maintenance for replacement of failed components. Often, the driver is unaware that a component has failed. This can lead to driving under conditions that are less than ideal, e.g., driving in the dark with a failed headlamp. More recent vehicles often have fixedly installed diagnostic systems that typically include a warning indicator light and/or audio alert to make the driver aware that a component has failed. However, this presents the same problem as encountered in the refuelling and scheduled maintenance situations described above. Namely, drivers have no spare time to have the vehicle serviced when alerted, and forget about the need to have the vehicle serviced after exiting the vehicle. This process may be repeated several times until the vehicle is eventually serviced, but the vehicle may in the interim be driven under conditions that are less than ideal.

Therefore, there exists a need to provide an enhanced diagnostic mechanism that better alerts and reminds a driver to the need for refuelling, routine maintenance and unscheduled maintenance.

SUMMARY OF THE INVENTION

An object of the present invention is to provide an enhanced diagnostic mechanism that addresses these and other problems associated with the prior art.

These and other objects of the present invention are achieved by providing an apparatus, program product, and method of processing diagnostic data transferred from a host computer, such as a motor vehicle computer, to a portable computer, such as a personal digital assistant (PDA), cellular phone, etc. A visual and/or audio alert is provided to a user based on a comparison in the portable computer of a threshold variable and a diagnostic variable. The diagnostic variable is based on the diagnostic data transferred to the portable computer from the host computer. The diagnostic variable may be, for example, indicative of an amount of fuel remaining in a motor vehicle, and/or the time elapsed and/or distance driven since a previous maintenance event for a motor vehicle, such as an engine oil change. The present invention can more effectively alert and remind the user of the need for service events, such as refuelling, routine maintenance and unscheduled maintenance of a motor vehicle, for example. Because the portable computer is removable from a motor vehicle, for example, a driver can be reminded of the need for the service event throughout the day, rather than only when he or she is in the motor vehicle as is the case with a conventional fixed installed diagnostic systems.

The threshold variable is preferably generated from a desired threshold value input into the portable computer by the user. Consequently, the threshold variable may be adjusted based on the individual needs of the user. For example, a driver may desire to change his or her engine motor oil at a different interval than a conventional fixedly installed diagnostic system would dictate, or to receive an alert to change his or her engine motor oil earlier than a conventional fixedly installed diagnostic system would dictate.

Preferably, the alert comprises a new calendar entry in a viewable calendar displayed on the portable computer. Consequently, time is provided in the user's schedule to address the service event.

The alert preferably further comprises an alarm at a time-of-day preceding an alarm clock setting of the portable computer. Consequently, the user does not have to rely on his or her memory to arise earlier in the morning to fill up with gasoline, for example.

Preferably, the portable computer receives the diagnostic data from the host computer through a serial link, a parallel link, a modem link, wireless link, etc. The diagnostic data is preferably received in response to placing the portable computer in a cradle, which is preferably mounted in a location that is easily accessed by the user, e.g., a vehicle passenger compartment.

BRIEF DESCRIPTION OF THE DRAWINGS

The present invention together with the above and other objects and advantages can best be understood from the following detailed description of the embodiments of the invention illustrated in the drawings, wherein like reference numerals denote like elements.

DETAILED DESCRIPTION OF THE PREFERRED EMBODIMENTS

Hardware and Software Environment

Figure 1:
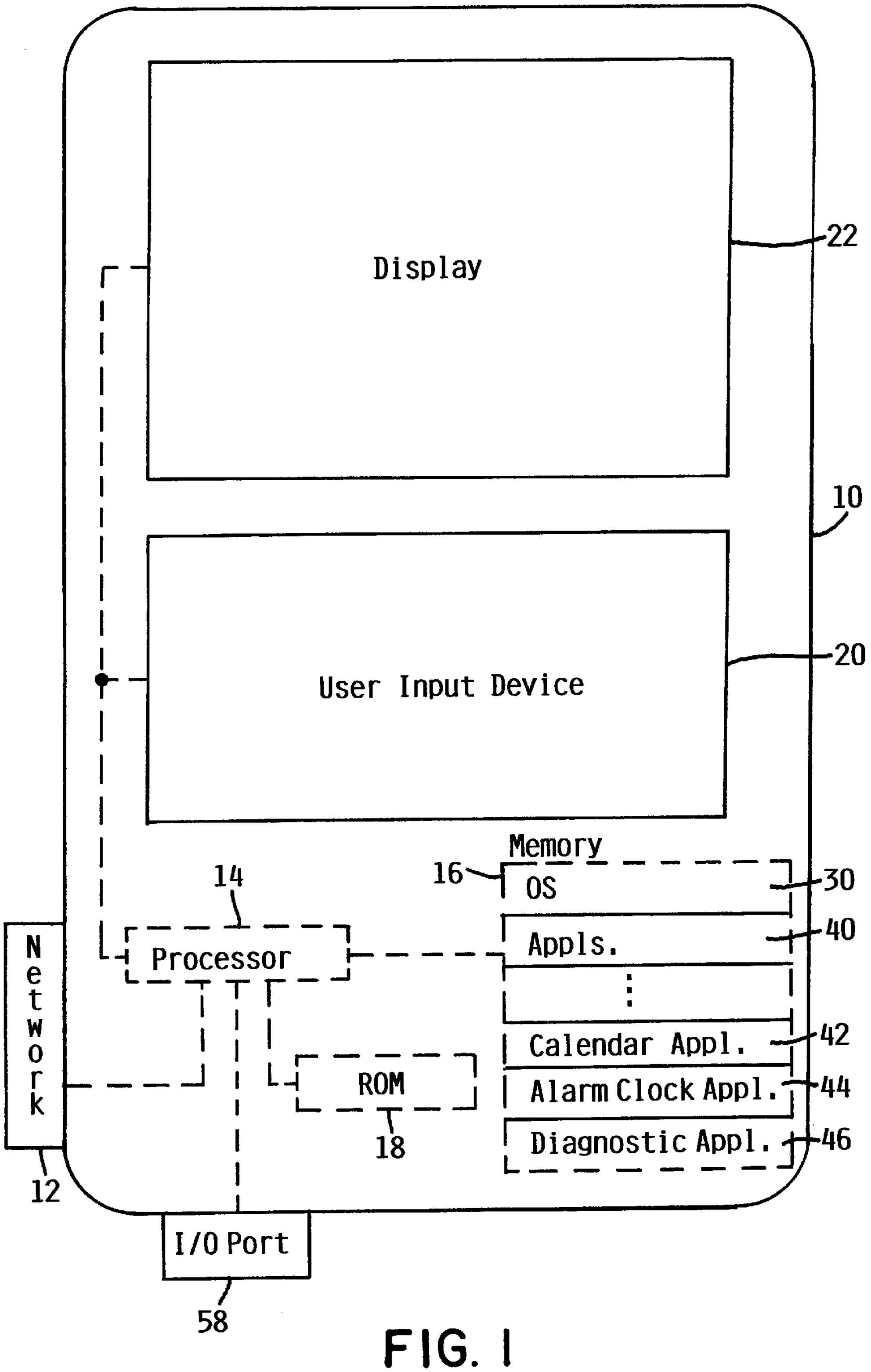
FIG. 1 is a block diagram of an exemplary hardware and software environment for a portable computer consistent with the present invention.

FIG. 1 illustrates an exemplary hardware and software environment for a portable computer 10 consistent with the present invention. For the purposes of the present invention, portable computer 10 may represent practically any type of small portable computer, computer system or other programmable electronic device, including a personal digital assistant (PDA), a cellular phone or related wireless device, a notebook computer, an embedded controller, etc. Examples of common PDAs include the PalmPilot™ line available from Palm, Inc., the WorkPad™ line available from International Business Machines Corporation, and the Jordana™ line available from Hewlett-Packard Company.

Portable computer 10 may be coupled to one or more computers (e.g., a desktop or PC-based computer, workstations, a PC-based server, a minicomputer, a midrange computer, a mainframe computer, etc.) through a network 12, or may be a stand-alone device in the alternative. For example, network 12 may be a local-area network (LAN), a wide-area network (WAN), a wireless network, and a public network (e.g., the Internet). Moreover, any number of computers and other devices may be networked through the network 12, e.g., multiple servers.

Portable computer 10 typically includes at least one processor 14 coupled to a memory 16. Processor 14 may represent one or more processors (e.g., microprocessors), and memory 16 may represent the random access memory (RAM) devices comprising the main storage of portable computer 10, as well as any supplemental levels of memory, e.g., cache memories, non-volatile or backup memories (e.g., programmable or flash memories), read-only memories, etc. In addition, memory 16 may be considered to include memory storage physically located elsewhere in portable computer 10, e.g., any cache memory in a processor 14, as well as any storage capacity used as a virtual memory, e.g., as stored on a mass storage device, if any, or on another computer coupled to portable computer 10 via network 12.

Portable computer 10 typically includes a read-only memory (ROM) 18 coupled to processor 14. ROM 14 may represent one or more non-volatile programmable ROMs, such as electronically erasable programmable read-only memories (EEPROMs), flash ROMs, erasable programmable read-only memories (EPROMs), etc.

For additional storage, portable computer 10 may optionally include one or more mass storage devices (not shown), e.g., a floppy or other removable disk drive, a hard disk drive, a direct access storage device (DASD), an optical drive (e.g., a CD drive, a DVD drive, etc.), and/or a tape drive, among others.

Portable computer 10 also typically receives a number of inputs and outputs for communicating information externally. For interface with a user or operator, portable computer 10 typically includes one or more user input devices 20 (e.g., a keypad, a stylus, a keyboard, a mouse, a trackball, a joystick, a touchpad, and/or a microphone, among others) and one or more displays 22 (e.g., an LCD display panel, a speaker, and/or a CRT monitor, among others). User input device 20 may include a voice recognition system and a microphone to allow activation of various functions by voice command. Similarly, display 22 may include a voice synthesis system and a speaker to allow playback of voice messages. User input device 20 and display 22 may be combined in the form of a touch sensitive screen.

Figure 2:
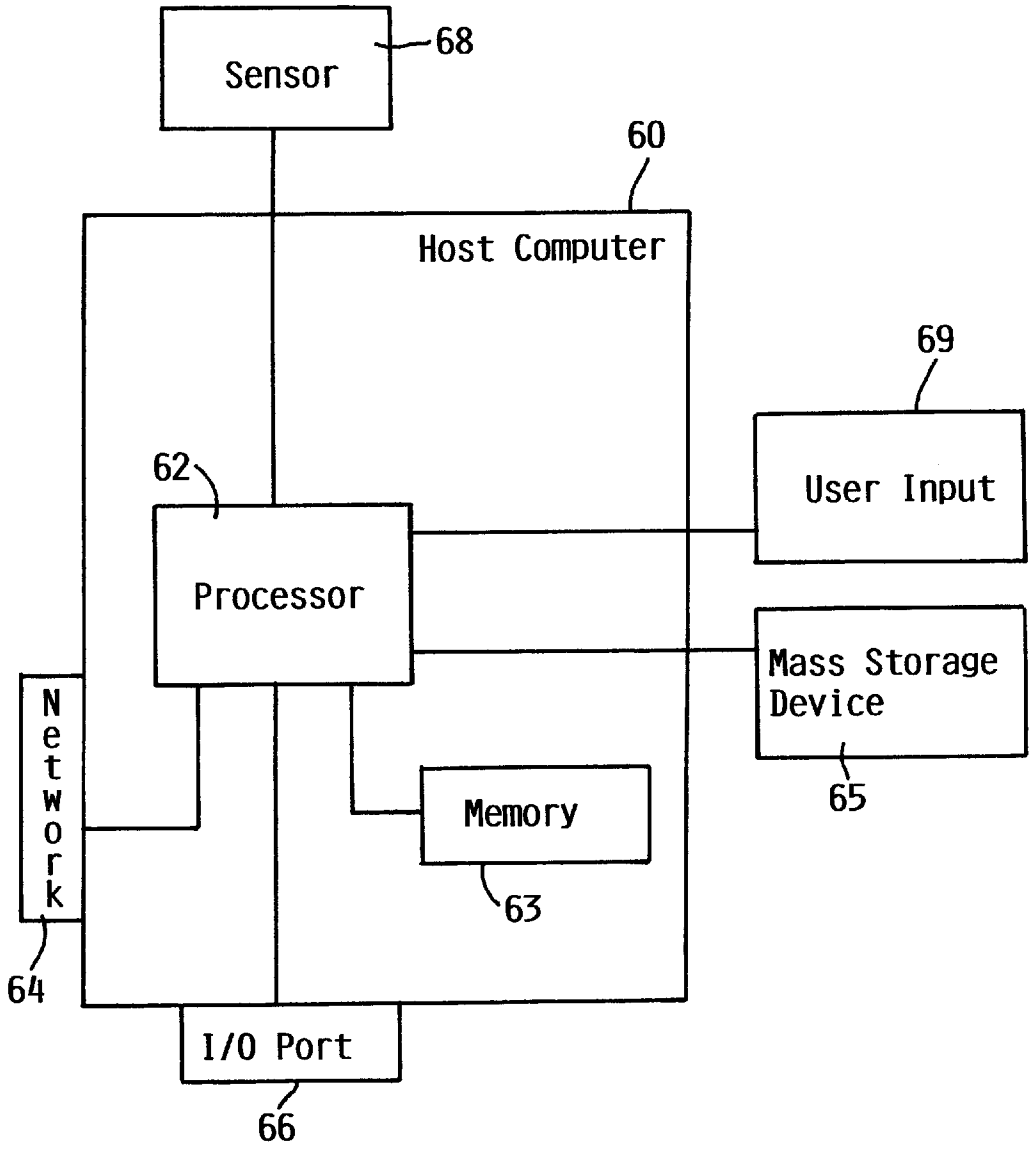
FIG. 2 is a block diagram of an exemplary hardware environment for a host computer consistent with the present invention.

Portable computer 10 includes an I/O port 58 through which diagnostic data is received from a host computer 60 (shown in FIG. 2). Portable computer 10 receives the diagnostic data from the host computer 60 through a wired and/or wireless link. For example, I/O port 58 may represent a serial port (e.g., a RS-232 interface, a RS-422 interface, a RS-423 interface, a universal serial bus (USB) port, a USB HotSync® port, etc.), a parallel port, a modem port, or a wireless port (e.g., an infrared port, radio frequency (RF) port, etc.).

In a case where host computer 60 operates within a vehicle communication bus system, I/O port 58 may allow for proper electrical coupling between portable computer 10 and a vehicle communication bus of the vehicle communication bus system. Several standards for such vehicle communication buses and bus systems exist. Illustrative examples include SAE J1587 (Joint SAE/TMC Electronics Data Interchange Between Microcomputer Systems in Heavy-Duty Vehicle Applications, July 1998), SAE J1708 (Serial Data Communications Between Microcomputer Systems in Heavy-Duty Vehicle Applications, October 1993), and ISO 11519 (Low-Speed Serial Data Communication, June 1994) published by the Society of Automotive Engineers, each of which is incorporated herein by reference. As such, I/O port 58 may be configured according to the protocol for message exchange across the vehicle communication bus. Such protocols and procedures are well known in the art and need not be reproduced in detail here.

It should be appreciated that portable computer 10 typically includes suitable analog and/or digital interfaces between processor 14 and each of network 12, memory 16, ROM 18 and I/O port 58, as is well known in the art.

Portable computer 10 operates under the control of an operating system 30, and executes various computer software applications, components, programs, objects, modules, etc. (e.g., executable programs 40–46, among others). Moreover, various applications, components, programs, objects, modules, etc. may also execute on one or more processors in another computer coupled to portable computer 10 via network 12, e.g., in a distributed or client-server computing environment, whereby the processing required to implement the functions of a computer program may be allocated to multiple computers over a network.

Typically included among the programs executed by portable computer 10 are a calendar application 42 and an alarm clock application 44. Calendar applications are well known in the art, as are alarm clock applications. The user typically employs calendar application 42 to input calendar information (typically, via user input device 20) and to display the calendar information (typically, via display 22). The calendar information is typically stored in non-volatile memory, e.g., ROM 18, so that the calendar information is retained after the portable computer is turned off. For example, the user may employ calendar application 42 as a scheduling aid, e.g., to avoid missing appointments. The user typically employs alarm clock application 44 to input a time-of-day (typically, via user input device 20) at which an alarm is to be activated (typically, via display 22). The time-of-day information is typically stored in non-volatile memory, e.g., ROM 18, so that the time-of-day information is retained after portable computer 10 is turned off. For example, the user may employ alarm clock application 44 to awaken in the morning at a predetermined time. As discussed in more detail below, portable computer 10 also includes a diagnostic program 46 according to an aspect of the present invention.

Typically, the operating system 30 and various computer software applications, components, programs, objects, modules, etc. (e.g., application programs 40–46) are loaded into memory 16 from non-volatile memory, e.g., ROM 18 and/or a mass storage device, if any. For example, relatively modest small portable computers, such as PDAs, cellular phones and related wireless devices, embedded controllers, etc., typically do not contain a mass storage device and thus the operating system 30 and the various computer software applications, components, programs, objects, modules, etc. are typically loaded into memory 16 from ROM 18 upon power up. On the other hand, relatively robust small portable computers, such as notebook computers, typically contain a mass storage device and thus the operating system 30 and the various computer software applications, components, programs, objects, modules, etc. are typically loaded into memory 16 from the mass storage device and/or ROM 18 upon power up.

In general, the routines executed to implement the embodiments of the invention, whether implemented as part of an operating system or a specific application, component, program, object, module or sequence of instructions will be referred to herein as "computer programs", or simply "programs". The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 2 is a block diagram of an exemplary hardware environment for a host computer 60 consistent with the present invention. For the purposes of the present invention, host computer 60 may represent practically any type of computer, computer system or other programmable electronic device that outputs diagnostic data. For example, as discussed in more detail below with respect to FIG. 3, host computer 60 may be a motor vehicle computer or an embedded controller that outputs diagnostic data relating to refuelling, routine maintenance and/or unscheduled maintenance of a motor vehicle in which it is installed. It should be appreciated, however, that host computer 60 may be present in other environments such as in home appliance applications, industrial equipment applications, etc. Although referred to hereinafter as a "host computer" it should be appreciated this term may also include other suitable programmable electronic devices consistent with the present invention.

Host computer 60 typically includes at least one processor 62 coupled to a memory 63. Processor 62 may represent one or more processors (e.g., microprocessors), and memory 63 may represent the random access memory (RAM) devices comprising the main storage of host computer 60, as well as any supplemental levels of memory, e.g., cache memories, non-volatile or backup memories (e.g., programmable or flash memories), read-only memories, etc. In addition, memory 62 may be considered to include memory storage physically located elsewhere in host computer 60, e.g., any cache memory in a processor 62, as well as any storage capacity used as a virtual memory, e.g., as stored on a mass storage device, if any, or on another computer coupled to host computer 60 via a network 64.

Host computer 60 may be coupled to one or more computers (e.g., a desktop or PC-based computer, workstations, a PC-based server, a minicomputer, a midrange computer, a mainframe computer, etc.) through network 64, or may be a stand-alone device in the alternative. For example, network 64 may be a local-area network (LAN), a wide-area network (WAN), a wireless network, and a public network (e.g., the Internet). Moreover, any number of computers and other devices may be networked through network 64, e.g., multiple servers.

For additional storage, host computer 60 may optionally include one or more mass storage devices 65, e.g., a floppy or other removable disk drive, a hard disk drive, a direct access storage device (DASD), an optical drive (e.g., a CD drive, a DVD drive, etc.), and/or a tape drive, among others.

Host computer 60 also typically receives a number of inputs and outputs for communicating information externally. As is well known in the art, processor 62 may receive an input from one or more sensors 68, each providing sensor information related to the diagnostic data. For example, sensor 68 may sense conditions associated with a motor vehicle component, e.g., the amount of fuel remaining in a gas tank, tire air pressure, a burned out headlamp, etc. Such sensor derived diagnostic data and the data structures thereof are well known in the art.

For interface with a user or operator, host computer 60 may include one or more user input devices 69 (e.g., a reader device, a keypad, a stylus, a keyboard, a mouse, a trackball, a joystick, a touchpad, and/or a microphone, among others). User input device 69 may be utilized by a service mechanic or technician, for example, to input service information related to the diagnostic data. For example, when a maintenance service is performed (e.g., the engine oil and filter is changed, the chassis is lubricated, the tires rotated, the air filter replaced, the spark plug replaced, the engine coolant replaced, the transmission fluid replaced, the engine belt replaced, the brake pad replaced, etc), a service mechanic or technician may enter the type of service via user input device 69. As an illustrative example, after performing an engine oil and filter change, a service mechanic or technician may pass a token through a reader device that processor 62 associates with engine oil and filter changes. Upon receiving the output of the reader device, processor 62 stores a log entry of the engine oil and filter change in a non-volatile portion of memory 63. In addition to a field identifying the service event, the log entry typically also includes fields identifying the date and/or the mileage of the vehicle when the log entry was stored. Such user input device derived diagnostic data and the data structures thereof are well known in the art.

The diagnostic data from processor 62 of host computer 60 is communicated to portable computer 10 via I/O port 66. Portable computer 10 receives the diagnostic data from the host computer 60 through a wired and/or wireless link. For example, I/O port 66 may represent a serial port (e.g., a RS-232 interface, a RS-422 interface, a RS-423 interface, a universal serial bus (USB) port, a USB HotSync® port, etc.), a parallel port, a modem port, or a wireless port (e.g., an infrared port, radio frequency (RF) port, etc.).

In a case where host computer 60 operates within a vehicle communication bus system, I/O port 66 may allow for proper electrical coupling between portable computer 10 and a vehicle communication bus of the vehicle communication bus system. Several standards for such vehicle communication buses and bus systems exist. Illustrative examples include SAE J1587 (Joint SAE/TMC Electronics Data Interchange Between Microcomputer Systems in Heavy-Duty Vehicle Applications, July 1998), SAE J1708 (Serial Data Communications Between Microcomputer Systems in Heavy-Duty Vehicle Applications, October 1993), and ISO 11519 (Low-Speed Serial Data Communication, June 1994) published by the Society of Automotive Engineers, each of which is incorporated herein by reference. As such, I/O port 66 may be configured according to the protocol for message exchange across the vehicle communication bus. Such protocols and procedures are well known in the art and need not be reproduced in detail here.

It should be appreciated that host computer 60 typically includes suitable analog and/or digital interfaces between processor 62 and each of memory 63, network 64, I/O port 66, sensor 68, and user input device 69, as is well known in the art.

Host computer 60 operates under the control of an operating system and executes various computer software applications, components, programs, objects, modules, etc. (e.g., executable programs, among others). Moreover, various applications, components, programs, objects, modules, etc. may also execute on one or more processors in another computer coupled to host computer 60 via network 64, e.g., in a distributed or client-server computing environment, whereby the processing required to implement the functions of a computer program may be allocated to multiple computers over a network.

Figure 3:
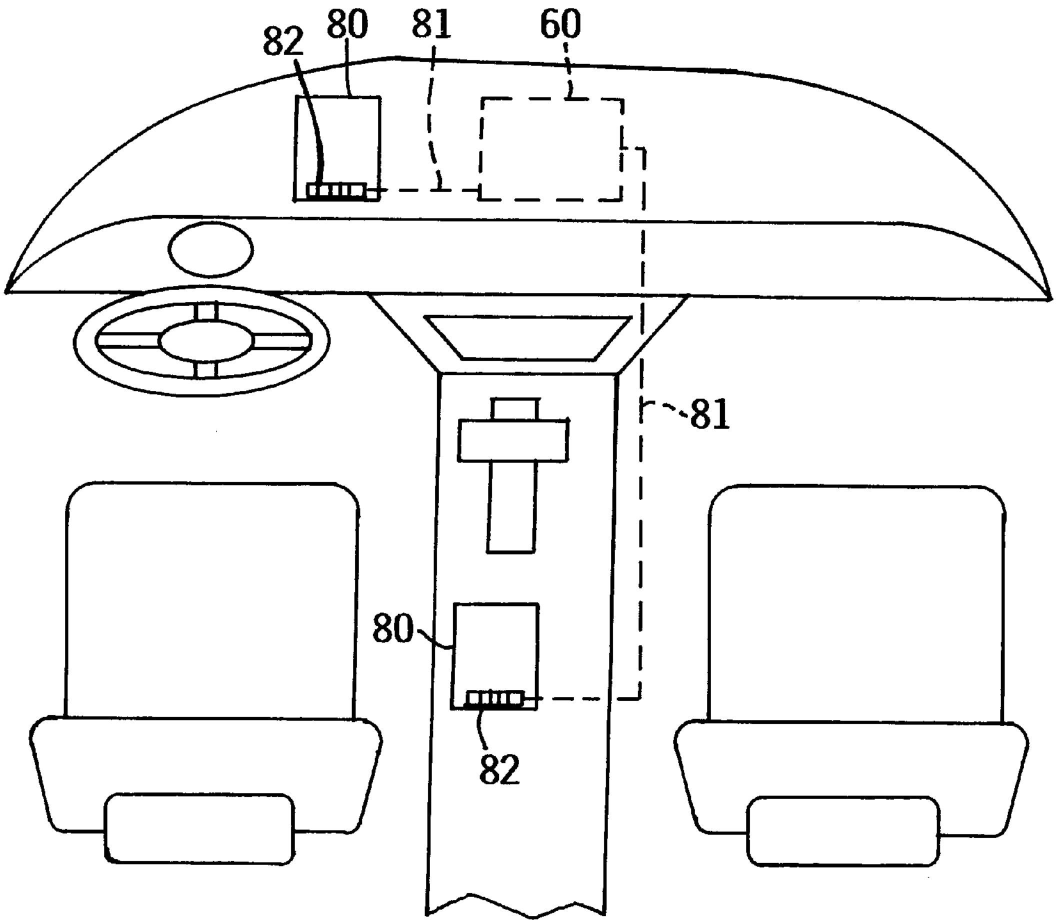
FIG. 3 is a schematic view of a passenger compartment of a motor vehicle containing two cradles for connecting the portable computer shown in FIG. 1 to the host computer shown in FIG. 2.

As shown in FIG. 3, the diagnostic data is preferably received by the portable computer in response to placing the portable computer in a cradle 80 having a connector 82, which is connected to the I/O port of host computer 60 through a link 81. In this case, the portable computer would have a corresponding connector (not shown) that is connected to the I/O port of the portable computer and that is arranged to make electrical contact with connector 82 when the portable computer is placed in cradle 80. Preferably, cradle 80 is mounted in a location that is easily accessed by the user, e.g., in a vehicle passenger compartment. For example, cradle 80 may be located on the vehicle's dashboard and/or center console. Certain pin connections of the connector associated with the portable computer's I/O port and corresponding pins of connector 82 associated with the host computer's I/O port may convey to both the portable computer and host computer 60 that the portable computer has been placed in cradle 80. This may commence an initiation protocol in both the portable computer and host computer 60, for example.

Alternatively, portable computer 10 may be directly connected to I/O port 66 of host computer 60 by a cable and/or wireless link in lieu of the cradle 80/connector 82 arrangement. In this alternative, I/O port 66 of host computer 60 is preferably mounted in a location suitable for connection to portable computer 10 via the cable or wireless link. For example, I/O port 66 may be mounted on the vehicle's dashboard and/or center console.

Those skilled in the art will recognize that the exemplary environments illustrated in FIGS. 1, 2 and 3 are not intended to limit the present invention. Indeed, those skilled in the art will recognize that other alternative hardware and/or software environments may be used without departing from the scope of the invention.

Transferring and Processing Diagnostic Data

Diagnostic program 46, which is stored in memory 16 for execution on processor 14, provides a visual alert and/or an audio alert to a user if a service event is required. Diagnostic program 46 contains a threshold variable and a diagnostic variable, and provides the alert based on a comparison of the-threshold variable and the diagnostic variable.

The threshold variable may be a default threshold value provided by diagnostic program 46. The default threshold value is stored in non-volatile memory, e.g. ROM 18. Preferably, however, the threshold variable is generated by diagnostic program 46 based on a desired threshold value input by the user, e.g., through user input device 20.

The diagnostic variable is generated by diagnostic program 46 based on the diagnostic data transferred to portable computer 10 from host computer 60. The diagnostic data relates to service events such as refuelling, routine maintenance and/or unscheduled maintenance of a motor vehicle in which host computer 60 is installed. For example, the diagnostic data may be indicative of an amount of fuel remaining in a motor vehicle. Likewise, the diagnostic data may be indicative of the time elapsed and/or distance driven since a previous predetermined maintenance event for a motor vehicle, such as an engine oil and filter change, chassis lubrication, tire rotation, air filter replacement, spark plug replacement, engine coolant replacement, transmission fluid replacement, engine belt replacement, brake pad replacement, etc. Likewise, the diagnostic data may be indicative of a component failure (e.g., a burned out headlamp) or a component being out of specification (e.g., a tire having low air pressure). It should be appreciated, however, that host computer 60 may be present in other environments such as in home appliance applications, industrial equipment applications, etc., and thus the diagnostic data output therefrom may relate to different service events.

The present invention can more effectively alert and remind the user of the need for service events. Because portable computer 10 is removable from a motor vehicle, for example, a driver can be reminded of the need for the service event throughout the day, rather than only when he or she is in the motor vehicle as is the case with a conventional fixed installed diagnostic systems.

As mentioned above, the threshold variable is preferably generated by diagnostic program 46 from a desired threshold value input into portable computer 10 by the user. Consequently, the threshold variable may be adjusted based on the individual needs of the user. For example, a driver may desire to change his or her engine motor oil at a different interval than a conventional fixedly installed diagnostic system or a default threshold value would dictate, or to receive an alert to change his or her engine motor oil earlier than a conventional fixedly installed diagnostic system or a default threshold value would dictate.

Diagnostic program 46 provides a visual alert and/or audio alert using display 22, for example. The alert may, for example, take the form of a textual message on an LCD panel of display 22 and/or an audio message played through a speaker of display 22. In its simplest form, the alert merely informs the user of that a service event needs to be addressed and/or the identity of the service event that needs to be addressed.

Preferably, however, the alert comprises a new calendar entry in a viewable calendar displayed on portable computer 10. As is conventional, calendar program 42 displays a calendar on display 22. In this case, diagnostic program 46 causes calendar program 42 to add a new calendar entry to the displayed calendar if the comparison of the threshold variable and the diagnostic variable indicates that a service event is required. The new calendar entry may have a default a default timing (i.e., date and time-of-day), content and/or duration provided by diagnostic program 46. For example, in a situation where the comparison indicates the need for a refuelling, diagnostic program 46 may cause calendar program 42 to add a new calendar entry of 15 minutes duration to the calendar before a first entry that already exists on the calendar for following day. The content of the new entry may be, for example, “maintain vehicle”, “refuel vehicle”, etc. The foregoing example is presented for purpose of illustration. Diagnostic program 46 may provide a different default timing, content and/or duration. Moreover, the default timing, content and/or duration generated by diagnostic program 46 may depend on type of service event required. Alternatively, the timing, content and duration of the new calendar entry may be generated by diagnostic program 46 based on input by the user, e.g., through user input device 20. In any event, time is provided in the user’s schedule to address the service event.

The alert preferably further comprises an alarm at a time-of-day preceding an alarm clock setting of the portable computer 10. As is conventional, alarm clock program 44 activates an alarm at a time-of-day set by the user through user input device 20. Typically, alarm clock program 44 activates the alarm using display 22, e.g., a speaker thereof. For example, the user may employ alarm clock program 44 to awaken in the morning at a predetermined time, e.g., 6:00 am. In this case, if the comparison of the threshold variable and the diagnostic variable indicates that a service event is required, diagnostic program 46 causes alarm clock program 44 to reset the time-of-day setting. on the date of the new calender entry added to the calendar. The time-of-day setting is reset earlier by an amount of time that may be equal to the duration of the new calendar entry. For example, if the duration of the new calendar entry is 15 minutes and the time-of-day setting is 6:00 am, diagnostic program 46 causes alarm clock program 44 to reset the time-of-day setting to 5:45 am. Consequently, the user does not have to rely on his or her memory to arise earlier in the morning to fill up with gasoline, for example.

Figure 4:
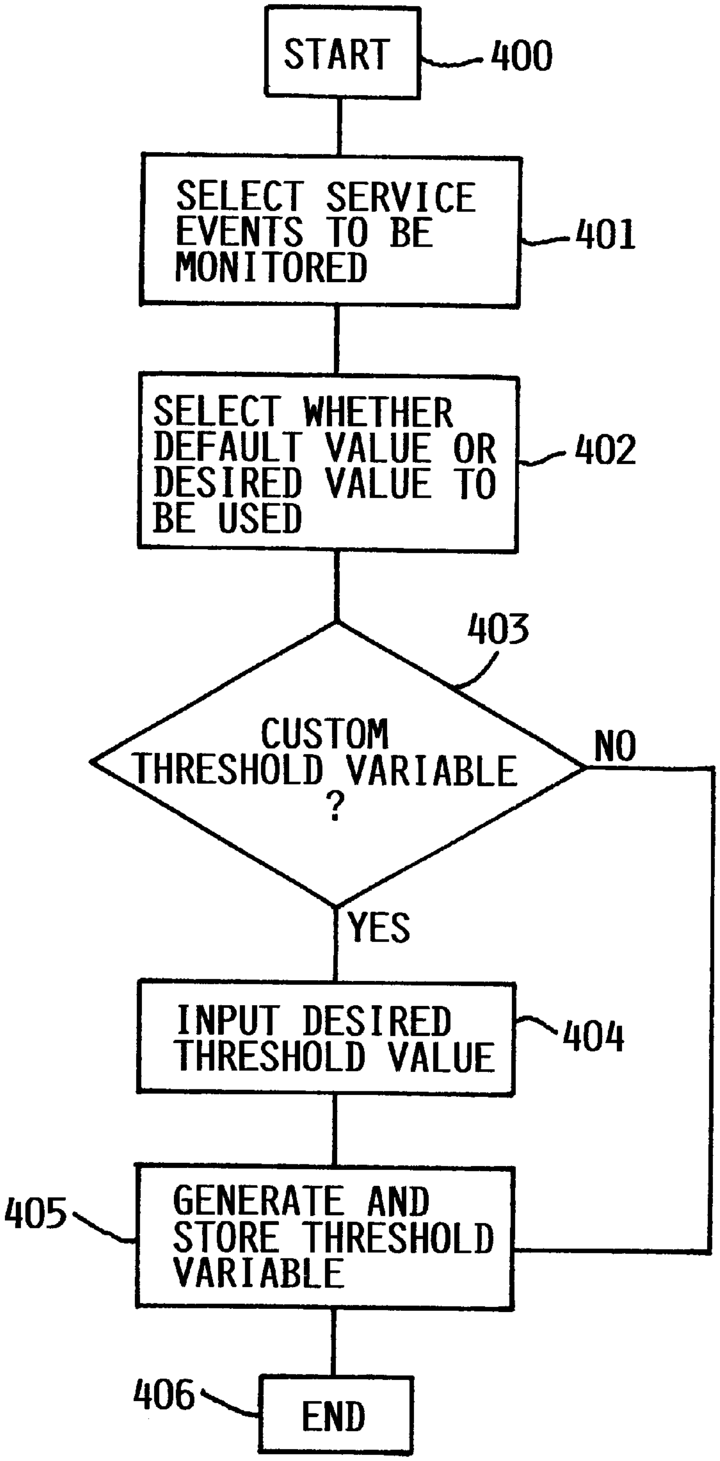
FIG. 4 is a flow diagram illustrating steps for setting up a diagnostic program shown in FIG. 1.

FIG. 4 is a flow diagram illustrating steps for setting up diagnostic program 46 in portable computer 10. At block 400, the set up process begins. For example, the user may start diagnostic program 46 by using input device 20 to select a diagnostic program icon presented on display 22.

At block 401, the user selects the service events to be monitored by diagnostic program 46. For example, diagnostic program 46 may present a list of service events on display 22, and the user may use input device 20 to select (e.g., via radio buttons) the service events to be monitored from among the list of service events. The list, for example, may include motor vehicle service events such as refuelling, routine maintenance (e.g., an engine oil and filter change, chassis lubrication, tire rotation, air filter replacement, spark plug replacement, engine coolant replacement, transmission fluid replacement, engine belt replacement, brake pad replacement, etc.) and/or unscheduled maintenance (e.g., a burned out headlamp, a tire having low air pressure, etc). It should be appreciated, however, that the list may include service events relevant to other environments such as in home appliance applications and industrial equipment applications. Block 401 may be omitted, e.g., if all of the service events are to be monitored, or if diagnostic program 46 monitors only a single service event.

At block 402, the user selects whether diagnostic program 46 is to use a default threshold value for the threshold variable or a desired threshold value for the threshold variable (i.e., a custom threshold variable). For example, diagnostic program 46 may present a list of service events to be monitored on display 22, and the user may use input device 20 to select (e.g., via radio buttons), for each of the service events to be monitored (i.e., individually), whether diagnostic program 46 is to use a default threshold value or a desired threshold value.

Alternatively, diagnostic program 46 may present a query on display 22, and the user may use input device 20 to select (e.g., via radio buttons) whether diagnostic program 46 is to use default threshold values or desired threshold values for all of the service events to be monitored (i.e., as a group).

At block 403, diagnostic program 46 determines whether the user selected to use a desired threshold value at block 402. If the user selected to use a desired threshold value, diagnostic program 46 proceeds to block 404. On the other hand, if the user selected to use only default threshold values, diagnostic program 46 proceeds to block 405.

At block 404, the user inputs a desired threshold value for each of the custom threshold variables to be monitored. For example, diagnostic program 46 may present a list of service events to be monitored using custom threshold variables on display 22, and the user may use input device 20 to input a desired threshold value for each of service events on the list. Alternatively, diagnostic program 46 may present a query on display 22 for each of the service events to be monitored using custom threshold variables, and the user may use input device 20 to input a desired threshold value for each query individually in succession. In either case, diagnostic program 46 may present on display 22 a suggested value (e.g., the default threshold value) or a suggested range of values for each of the desired threshold values to be input. Alternatively, diagnostic program 46 may give the user no guidance in regard to choosing the desired threshold values to be input. The desired threshold values may be indicative of values (e.g., minimum volume of fuel remaining for alert to be activated, maximum time elapsed since a previous service event for alert to be activated, maximum distance driven since a previous service event for alert to be activated, maximum and/or minimum air pressure of a tire for alert to be activated, etc.) or states (e.g., component failed for alert to be activated). As such, the default and desired threshold values may be a single bit to one or more bytes in length.

Blocks 402, 403 and 404 may be omitted if diagnostic program 46 uses only default threshold values, whereas blocks 402 and 403 may be omitted if diagnostic program 46 uses only custom values.

At block 405, diagnostic program 46 sets a threshold variable equal to a default threshold value for each default threshold value selected at block 402, if any, and stores the resulting threshold variable in non-volatile memory, e.g., ROM 18. In addition, at block 405, diagnostic program 46 generates a threshold variable for each of the custom threshold variables input at block 404, if any, and stores the resulting threshold variable in non-volatile memory, e.g., ROM 18. The threshold variables may be indicative of values (e.g., minimum volume of fuel remaining for alert to be activated, maximum time elapsed since a previous service event for alert to be activated, maximum distance driven since a previous service event for alert to be activated, maximum and/or minimum air pressure of a tire for alert to be activated, etc.) or states (e.g., component failed for alert to be activated). As such, the threshold variables may be a single bit to one or more bytes in length. The set up process then ends at block 406.

Figure 5:
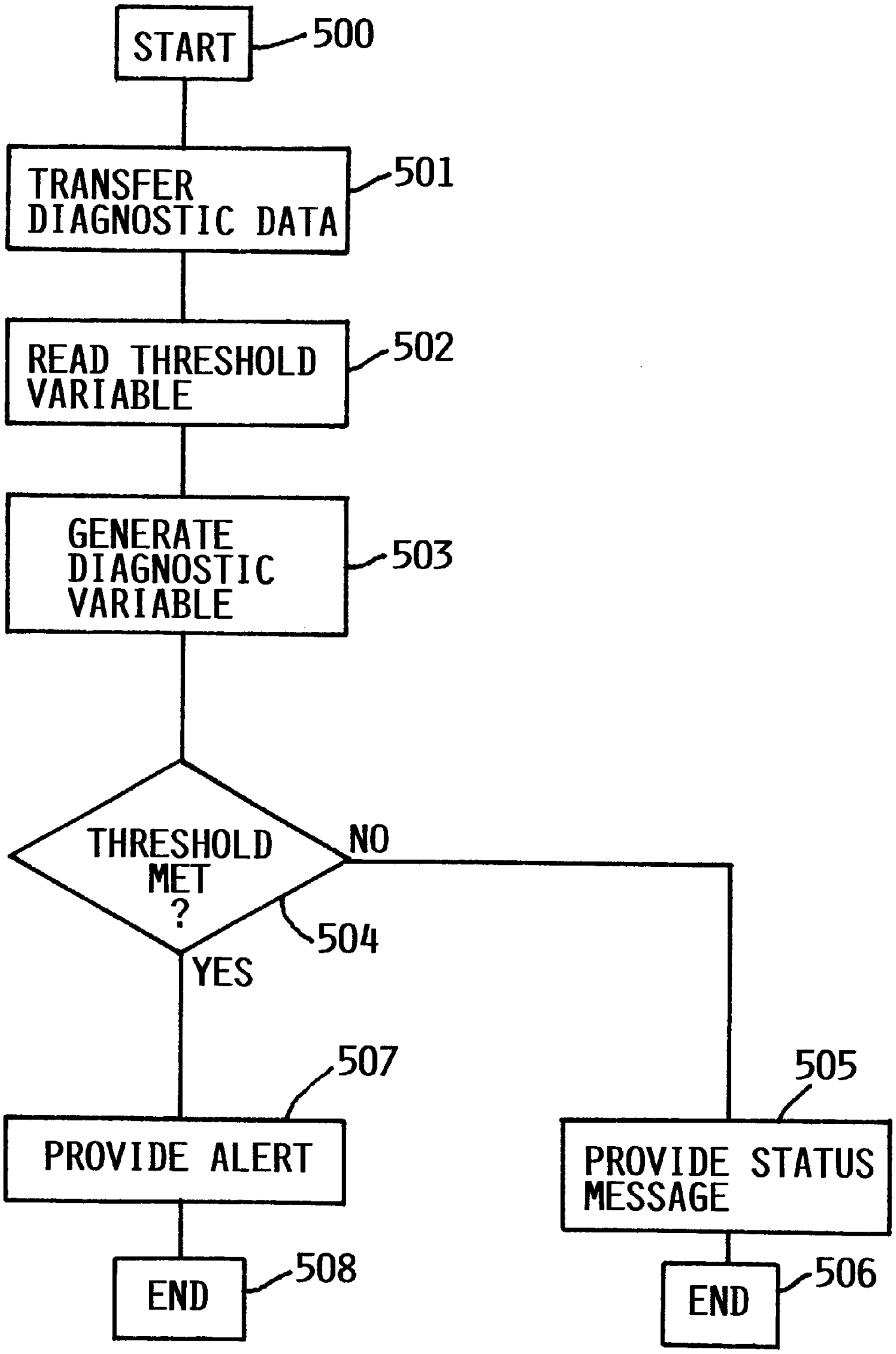
FIG. 5 is a flow diagram illustrating steps for transferring diagnostic data from the host computer shown in FIG. 2 to the portable computer shown in FIG. 1, and processing the diagnostic data in the portable computer.

FIG. 5 is a flow diagram illustrating steps for transferring diagnostic data from host computer 60 to the portable computer 10, and processing the diagnostic data in portable computer 10. At block 500, the process begins. For example, the user may start the transfer of diagnostic data by placing portable computer 10 in cradle 80. Alternatively, the user may start the transfer of diagnostic data by connecting I/O port 58 of portable computer 10 to I/O port 66 of host computer 60 using a cable or wireless link. In either case, this may commence an initiation protocol in both portable computer 10 and host computer 60.

At block 501, processor 62 of host computer 60 transfers diagnostic data from memory 63 to portable computer 10. Processor 14 of portable computer 10 receives the diagnostic data transferred from host computer 60, and diagnostic program 46 causes the diagnostic data to be stored in memory 16.

At block 502, diagnostic program 46 causes processor 14 to read the threshold variable or variables from ROM 18 and to store the threshold variable or variables in memory 16.

At block 503, diagnostic program 46 causes processor 14 to generate a diagnostic variable or variables based on the diagnostic data. Diagnostic program 46 causes processor 14 to generate one diagnostic variable for each threshold variable and to store the diagnostic variable or variables in memory 16. Diagnostic program 46 generates the diagnostic variable or variables though a knowledge of the data format (e.g., field content, positions, and sizes) of the diagnostic data. In effect, diagnostic program 46 strips out the diagnostic variable or variables corresponding to the threshold variable or variables from the diagnostic data. Each diagnostic variable is stored in memory 16 so as to be associated with its corresponding threshold variable. The diagnostic variables may be indicative of values (e.g., volume of fuel remaining, time elapsed since a previous service event, distance driven since a last service event, air pressure of a tire, etc.) or states (e.g., component functioning, component failed). As such, the diagnostic variables may be a single bit to one or more bytes in length.

At block 504, diagnostic program 46 causes processor 14 to compare the corresponding diagnostic variables and threshold variables. For example, processor 14 compares diagnostic and threshold variables, such as volume of fuel remaining (diagnostic variable) and minimum volume of fuel remaining for alert to be activated (threshold variable), e.g., activate alert if volume of fuel remaining is ≦4 gallons;

time elapsed since a previous engine oil and filter change (diagnostic variable) and maximum time elapsed since a previous engine oil and filter change for alert to be activated (threshold variable), e.g., activate alert if time elapsed since a previous engine oil and filter change is ≧3 months;

distance driven since a previous engine oil and filter change (diagnostic variable) and distance driven since a previous engine oil and filter change for alert to be activated (threshold variable), e.g., activate alert if distance driven since a previous engine oil and filter change is ≧5000 miles;

air pressure of a tire (diagnostic variable) and minimum air pressure of a tire for alert to be activated (threshold variable), e.g., activate alert if air pressure of a tire is ≦28 psi;

air pressure of a tire (diagnostic variable) and maximum air pressure of a tire for alert to be activated (threshold variable), e.g., activate alert if air pressure of a tire is ≧32 psi;

headlamp failed (diagnostic variable) and headlamp failed for alert to be activated (threshold variable), e.g., activate alert if state is=1; etc.

If the comparison at block 504 indicates that the threshold is not met, i.e., no service event is required, then the process proceeds to block 505. On the other hand, if the comparison at block 504 indicates that the threshold is met, i.e., a service event is required, then the process proceeds to block 507.

At block 505, diagnostic program 46 causes a visual and/or audio status message to be activated on display 22. For example, the status message may indicate that the diagnostic program has been run and no service event is required. In this case, the process ends at step 506.

At block 507, diagnostic program 46 causes a visual and/or audio alert to be activated on display 22. The alert may, for example, take the form of a textual message on an LCD panel of display 22 and/or an audio message played through a speaker of display 22. Diagnostic program 46 may store the message in non-volatile memory, e.g., ROM 18. In its simplest form, the alert merely informs the user of that a service event needs to be addressed and/or the identity of the service event that needs to be addressed. Preferably, however, the alert comprises a new calendar entry in a viewable calendar displayed on display 22. In this case, diagnostic program 46 causes calendar program 42 to store the new calendar entry in non-volatile memory, e.g., ROM 18. The alert preferably further comprises an alarm (e.g., through a speaker of display 22) at a time-of-day preceding an alarm clock setting. In this case, diagnostic program 46 causes alarm clock program 44 to reset its alarm clock setting in non-volatile memory, e.g., ROM 18. After the alert is generated, the process ends at step 508.

While this invention has been described with respect to the preferred and alternative embodiments, it will be understood by those skilled in the art that various changes in detail may be made therein without departing from the spirit, scope, and teaching of the invention. For example, the diagnostic program may determine or refine the threshold variables based on the user's driving habits. In addition, the various inputs provided by the user (e.g., the input of desired threshold values, the selection of service events, the selection of default threshold values, etc.) to the portable computer may be provide by the user to the portable computer through a user input device of the motor vehicle, rather than through the user input device of the portable computer. Similarly, the various outputs provided to the user (e.g., the audio and/or visual alert, the calendar, the list of service events, the status message, etc.) on the display of the portable computer may instead be provided to the user on a display of the motor vehicle, such as a heads-up display, a center console display, an instrument panel display, etc. In such a case, the data transfer between the portable computer and the host computer may be bidirectional. Moreover, additional types of data may be transferred between the portable computer and the host computer, including location information and travel time. In addition, diagnostic and additional types of data may be tranferred between the portable computer and a plurality of host computers, e.g., in a fleet management environment. Accordingly, the herein disclosed invention is to be limited only as specified in the following claims.

What is claimed is:

1. An apparatus for processing diagnostic data transferred from a host computer to a portable computer, the apparatus comprising:

a processor in the portable computer;

memory connected to the processor;

a diagnostic program for providing at least one of a visual alert and an audio alert to a user, the program being stored in the memory for execution on the processor, the program containing a threshold variable and a diagnostic variable, the diagnostic variable being based on the diagnostic data transferred to the portable computer from the host computer, the program providing the alert based on a comparison in the portable computer of the threshold variable and the diagnostic variable.

2. The apparatus as recited in claim 1, further comprising a user input device on a surface of the portable computer, the user input device being connected to the processor, and wherein the program stores the threshold variable in the memory based on a desired threshold value input by the user through the user input device.

3. The apparatus as recited in claim 1, wherein the diagnostic variable is indicative of an amount of fuel remaining in a motor vehicle.

4. The apparatus as recited in claim 1, wherein the diagnostic variable is based on at least one of time elapsed and distance driven since a previous maintenance event for a motor vehicle.

5. The apparatus as recited in claim 4, wherein the previous maintenance event was an engine oil change.

6. The apparatus as recited in claim 1, further comprising a display on a surface of the portable computer, the display being connected to the processor, and wherein the alert is displayed on the display.

7. The apparatus as recited in claim 6, further comprising a calendar program for portraying a viewable calendar on the display, the calendar program being stored in the memory for execution on the processor, and wherein the alert provided by the diagnostic program comprises a new calendar entry in the viewable calendar.

8. The apparatus as recited in claim 7, further comprising an alarm clock program for providing at least one of a visual and audio alarm to the user at a predetermined time-of-day, the alarm clock program being stored in the memory for execution on the processor, and wherein the alert provided by the diagnostic program further comprises at least one of a visual alarm and an audio alarm at a preceding time-of-day before the predetermined time-of-day, the preceding time-of-day being before the predetermined time-of-day by an amount of time equal to the duration of the new calendar entry in the viewable calendar.

9. The apparatus as recited in claim 1, further comprising a cradle associated with the host computer, and wherein the diagnostic data is received by the portable computer from the host computer in response to placing the portable computer in the cradle.

10. The apparatus as recited in claim 9, wherein the cradle is mounted in a passenger compartment of a motor vehicle.

11. The apparatus as recited in claim 1, further comprising at least one of a serial, parallel, modem and wireless link between the host computer and the portable computer, and wherein the diagnostic data is received by the portable computer from the host computer through the link.

12. The apparatus as recited in claim 1, wherein the portable computer is a personal digital assistant.

13. A computer-implemented method, the computer-implemented method comprising the steps of:

transferring diagnostic data from a host computer to a portable computer;

generating a diagnostic variable in the portable computer based on the diagnostic data;

comparing the diagnostic variable with a threshold variable in the portable computer;

providing at least one of a visual alert and an audio alert to a user of the portable computer based on the comparing step.

14. The computer-implemented method as recited in claim 13, further comprising the steps of:

inputting a desired threshold value into the portable computer through a user input device on a surface of the portable computer;

generating the threshold variable in the portable computer based on the desired threshold value.

15. The computer-implemented method as recited in claim 13, wherein the providing step comprises a step of adding a new calendar entry in a viewable calendar displayed on the portable computer.

16. The computer-implemented method as recited in claim 15, wherein the providing step further comprises a step of providing a visual and/or audio alarm at a preceding time-of-day before a predetermined time-of-day, the preceding time-of-day being before the predetermined time-of-day by an amount of time equal to the duration of the new calendar entry in the viewable calendar, the predetermined time-of-day being set by the user using an alarm clock program.

17. The computer-implemented method as recited in claim 13, wherein the transferring step comprises the steps of:

placing the portable computer in a cradle associated with the host computer;

transferring the diagnostic data from the host computer to the portable computer in response to the placing step.

18. The computer-implemented method as recited in claim 17, wherein the portable computer is a personal digital assistant and the cradle is mounted in the passenger compartment of a motor vehicle.

19. A program product for processing diagnostic data transferred from a host computer to a portable computer, the program product comprising:

a signal bearing media; and a diagnostic program recorded on the signal bearing media, the program being capable of executing on a processor and containing a threshold variable and a diagnostic variable, the diagnostic variable being based on the diagnostic data transferred to the portable computer from the host computer, the program providing at least one of a visual alert and an audio alert to a user based on a comparison in the portable computer of the threshold variable and the diagnostic variable.

20. The program product as recited in claim 19, wherein the program stores the threshold variable in memory in the portable computer based on a desired threshold value input by the user through a user input device.

21. The program product as recited in claim 19, wherein the alert provided by the diagnostic program comprises a new calendar entry in a viewable calendar displayed on the portable computer.

22. The program product as recited in claim 21, wherein the alert provided by the diagnostic program further comprises at least one of a visual alert and an audio alarm at a preceding time-of-day before a predetermined time-of-day, the preceding time-of-day being before the predetermined time-of-day by an amount of time equal to the duration of the new calendar entry in the viewable calendar, the predetermined time-of-day being set by the user using an alarm clock program.

23. The program product as recited in claim 19, wherein the portable computer is a personal digital assistant.

24. The program product as recited in claim 23, wherein the personal digital assistant receives the diagnostic data from the host computer in response to placing the personal digital assistant in a cradle associated with the host computer and mounted in a passenger compartment of a motor vehicle.

25. The program product as recited in claim 19, wherein the signal bearing media is recordable media.

26. The program product as recited in claim 19, wherein the signal bearing media is transmission type media.

* * * * *